United States Patent Office 3,294,532
Patented Dec. 27, 1966

3,294,532
HOT MELT COMPOSITION FOR THREE-DIMENSIONAL PRINTING
Marion O. Brunson and James E. Huffaker, both of Kingsport, Tenn., assignors to Eastman Kodak Company, Rochester, N.Y., a corporation of New Jersey
No Drawing. Filed July 9, 1965, Ser. No. 470,911
10 Claims. (Cl. 96—27)

This is a continuation-in-part of Brunson and Huffaker Serial No. 102,663, filed April 13, 1961, and now abandoned.

This invention concerns a composition of hot melt plastic materials, more particularly coatings which may be embossed with a lenticular pattern for three-dimensional pictures. Hot melt applications of various plastic materials have been found suitable for a wide number of applications. The plastic material is applied in the molten state to various substrates, such as paper or the like, without requiring solvent recovery systems which are necessary for commonly used lacquer coatings.

Many of the hot melt coatings have been waxes or blends of waxes with other plastic materials. For instance, polyethylene has been combined with paraffin to provide a hot melt coating and cellulose esters have been applied satisfactorily using the hot melt method.

In order to provide a satisfactory coating for paper, particularly paper webs carrying colored pictures, printing or the like, on the surface, it is desirable to have a coating which would have good resistance to blocking, be resistant to abrasion, withstand folding, having good adhesion, and be resistant to solvents, stains, grease, and the like. However, the prior art compositions, while satisfactory in many respects, have not been found suitable in all the above desirable respects, particularly when a lenticular pattern such as that shown in U.S. Patent No. 2,297,846 has been embossed on the hot melt coating.

When the hot melt coating is intended for producing a three-dimensional effect, the material must be transparent and have a high refractive index (1.500 or higher). Since very slight abrasions of a relatively soft coating can result in destroying the effect of a lenticular pattern which is embossed on the coating, it has been desired to find a plastic coating which would be able to hold the embossed pattern and at the same time have the above desirable characteristics.

After extended investigation, we have discovered a polyolefin copolymer/hydrocarbon resin blend which has remarkably good coating characteristics when applied by the hot melt process which can be embossed with a lenticular pattern to provide a satisfactory three-dimensional effect.

One object of this invention is to provide a polyolefin copolymer/hydrocarbon resin blend for hot melt application. Another object is to provide a coating which is flexible enough to withstand folding, has good adhesion to all types of paper and printing inks, has good resistance to blocking, staining, mold release agents, and abrasion, is non toxic and colorless, exhibits an appealing hand, and has good heat sealability. Another object is to provide an embossed hot melt coating which gives a three-dimensional effect and which contains the embossed pattern. Still another object is to provide new products comprised of a colored picture, printing, and the like, in combination with our new coating. Other objects will appear hereinafter.

In the broader aspects of our invention, the above objects are obtained by combining a polypropylene-polybutene-1 copolymer, a synthetic hydrocarbon resin, and a slip agent.

The propylene–butene-1 copolymer may be obtained by copolymerizing propylene with butene-1 using any of the ionic catalysts used for the preparation of solid polymers of propylene such as catalyst complexes of metal halides with metal alkyls, etc. It contains 50 to 80% by weight propylene, balance butene-1. The preferred copolymer is 80% propylene and 20% butene-1. The molecular weight of the copolymer should be 20,000–50,000 having an inherent viscosity in tetralin at 145° C. exceeding 1.0 deciliter per gram (at a concentration of 0.25 g. per 100 ml.). These polymers are thermally degraded at temperatures of 250 to 450° C. in the substantial absence of oxygen to give wax-like solid products with a molecular range from 500–8,000 and densities of 0.88–0.93.

The propylene–butene-1 copolymer may be obtained by a thermal modification of a copolymer of propylene and butene-1 at temperatures from 250–450° C., and in the absence of oxygen. The heat causes a degradation to products having densities of 0.88–0.93 and molecular weights ranging from 500 to 8000. The thermal treatment may be carried out batchwise or continuously in vacuum or in an inert gas, in bulk, or in the presence of a suitable diluent such as hexane, mineral spirits, benzene, xylene, etc.

Further information concerning the copolymers useful according to our invention is to be found in copending Serial Nos. 277,445 and 277,446, both filed May 2, 1963, by our coworkers Coover and Guillet.

By hydrocarbon resins we mean resins produced by polymerization of unsaturates derived from the deep cracking of petroleum or from wood distillates. The former, that is, those produced by polymerization of unsaturates derived from deep cracking of petroleum have softening points of 50–150° C., a specific gravity 25/25° C. of .970–.980, an acid number of less than 1, an iodine value (Wijs) of 80–150, and a molecular weight of 500–2000, such as Piccopale. Resins of this type can be prepared by polymerizing the bottoms (distillation residue) resulting from deep thermal cracking of natural gas, consisting predominately of propane, followed by hydrogenation in the manner described in Examples 1 to 7 of Von Bramer et al., Serial No. 337,223, filed January 13, 1964. For example, 2500 parts of the bottoms are charged into a round bottom flask equipped with a stirrer, nitrogen inlet tube, addition funnel and reflux condenser. Said bottoms are stirred under nitrogen and chilled to 5° C. to 10° C. Fifty-two parts of boron trifluoride etherate (1% $BF_3$) are added dropwise over a 25-minute to 30-minute interval. The chilled mixture is stirred for an additional thirty minutes and allowed to warm to room temperature. External heat is applied to raise the temperature to 60–70° C. The reaction then proceeds exothermally and a cooling bath is used to hold the temperature in the range of 60–110° C. After the temperature begins to fall, external heat is applied and the mixture is refluxed at 130° C.–140° C. for four hours with a nitrogen purge to remove any $BF_3$ gas remaining in the system.

Seven hundred fifty parts of the resulting polymerized bottoms are removed from the flask and hydrogenated over a palladium on the carbon catalyst at 250° C. under 4000 p.s.i. hydrogen pressure. The crude viscous hydrogenated material is diluted with heptane, filtered to remove the hydrogenation catalyst and stripped of heptane to 90° C. at 200–250 mm. pressure. The polymerized, hydrogenated bottoms are then separated into three fractions by high vacuum distillation. The low boiling fraction, boiling to 100° C. at 100–200 microns pressure, is a water-white liquid. The intermediate fraction, boiling from 100° C. to 145° C. at 100–200 microns pressure, is also a water white liquid. The residue is an essentially water-white resin which has a ring and ball softening point of 116° C.

The latter hydrocarbon resins produced by polymerization of unsaturates derived from wood distillates have softening points of 40–150° C., a specilc gravity 25/25° C. of 0.970–0.980, an acid number of less than 1, and a molecular weight of 300–2000. Representative is Piccolyte S–135, a polyterpene composed essentially of beta-pinene.

Any slip agent known as an anti-block or anti-tack agent in plasticized resin formulations may be used in our composition, e.g., acetylated monoglyceride marketed as "Myvacet" or oleylamide. The amides of C–10 through C–30 saturated and unsaturated mono and polycarboxylic acids may be substituted for oleylamide. Other amides which may be used are described in U.S. Patent No. 2,770,609.

The following is our preferred composition.

| Material: | Parts by weight |
|---|---|
| Polypropylene–polybutene-1 copolymer | 89.5 |
| Hydrocarbon resin | 10.0 |
| Slip agent | 0.5 |

The following indicate the range of proportions which are operative in a broader aspect of our invention.

| Material: | Parts by weight |
|---|---|
| Polypropylene–polybutene-1 copolymer | 70–99.5 |
| Hydrocarbon resin | 0–30 |
| Slip agent | 0.25–1 |

Our melt coating composition is characterized in that each component of the blend has a specific function. The propylene–butene-1 copolymer furthers the clarity and produces a flexible, highly refractive base of high abrasion resistance. The hydrocarbon resin improves adhesion. The slip agent adds to the "feel" of the coating and serves as a release agent in the coating operation.

The following examples illustrate certain embodiments of our invention but are not intended to unduly limit the invention:

*Example I*

The following formulations have been found to be operative for coatings on paper:

| Material | A | B | C | D | E |
|---|---|---|---|---|---|
| Propylene-butene-1 copolymer | 90 | 80 | 95 | 100 | 50 |
| Polyethylene | | | | | 40 |
| Hydrocarbon resin | 9.5 | 19.5 | 4.5 | | 9.5 |
| Alkyl amide | | | 0.5 | | 0.5 |
| Myvacet | 0.5 | 0.5 | | | |

*Example II*

A coating blend containing our preferred embodiment described above of copolymer (80% polypropylene, 20% butene-1, prepared as described above, including thermal degradation), hydrocarbon resin, and slip agent (oleylamide in this instance) was heated to a molten state and coated on a paper surface to a thickness of 10 mils and permitted to cool. It was tested for physical characteristics and found to be flexible enough to withstand folding, to have good adhesion, and to have good resistance to blocking. It was resistant to abrasion, colorless, and had good heat stability.

The blend was also embossed by use of a refrigerated embossing cylinder with a lenticular pattern upon a specially prepared printed picture and the resulting coated picture had a good three-dimensional effect. The uncoated picture was prepared by taking a photograph using a camera specially designed for movement around the subject matter. The photograph was then used to make printing plates, from which printed reproductions were made. The printed picture, when coated and embossed with the above plastic blend, had a good three-dimensional effect. Brilliance of colors was enhanced as noted by visual observance. Coating and embossing may be in accordance with the process and the apparatus of our companion copending application Serial No. 75,400, filed December 12, 1960, now U.S. 3,110,608. In the coating operation involving the embossing step, the melt was found to have sufficient adhesion to the paper stock to adhere to the paper and at the same time the melt would not stick to the embossing roll.

Cellulose acetate butyrate melts which can be used with excellent results in many melt coating operations when substituted for the blend disclosed above exhibited some tendency to adhere to the embossing roll.

A combination of low molecular weight polyethylene (about 7000) with a hydrocarbon resin was also tried. It exhibited excessive softness.

*Example III*

A coating composition as used in Example II was prepared without the hydrocarbon resin component. It was found to have poor adhesion to the substrate and also tended to pull off during the embossing step.

*Example IV*

A coating composition the same as that used in Example II was prepared but the slip agent (oleylamide) was omitted. The coating tended to stick to the embossing roll and also had a sticky feel.

*Example V*

To demonstarte the criticality of the 50 to 80% content of propylene in the copolymer used in our hot melt composition two coated paper samples were prepared. For the first, the paper was coated with 1 mil of an 80/20 propylene–butene copolymer and for the second with a 50/50 copolymer.

Each sample is heated until the coating melted by holding a small flame under the paper until the coating became liquid. As soon as the coating melted, the flame was removed and the paper allowed to cool 5 to 10 seconds on a cold surface. After the coating had cooled, a finger was pressed against the area that had been melted. In the case of the 80/20 copolymer the coating was dry to touch. In the case of the 50/50 copolymer the coating tended to remain tacky for a period of 30–45 seconds.

This also illustrates a tendency for the copolymer to stick to the embossing roll if it contains less than about 50% polypropylene.

Although our preferred coating thickness for use in the three-dimensional lenticular embossing process is of the order of 10 mils, other thickness from, for example, 2–20 mils may be applied using our hot melt process, particularly as an overcoating for paper substrates for protection purposes and for enhancing the appearance of a printed or illustrated page. The physical characteristics of adhesion, flexibility, abrasion resistance, and the like, make these coatings especially suitable for many uses previously made using cellulose ester hot melt coatings or the like. That is, the new blend of the present invention may be used to produce smooth, glossly, protective coatings on papers by replacing the lenticulated embossing roll with a highly polished roll. The resulting coating has good gloss, hardness, flexibility, scuff resistance, and moisture vapor resistance.

This invention has been described in detail with particular reference to preferred embodiments thereof, but it will be understood that variations and modifications can be effected within the spirit and scope of the invention as described hereinabove and as defined in the appended claims.

We claim:

1. A coating composition adapted for forming a three-dimensional picture consisting essentially of about 89.5% by weight of a thermally degraded copolymer of 50 to 80% propylene and 20 to 50% butene-1 characterized by being made up of components having densities of 0.88 to 0.93 and molecular weights of 500 to 8,000, about 10% by weight of a polyterpene consisting essentially of beta-pinene and about 0.5% by weight of oleylamide.

2. A substrate having coated thereon as a lenticular pattern a coating composition adapted for causing a three-dimensional or animated effect consisting essentially of about 89.5% by weight of a thermally degraded copolymer of 50 to 80% propylene and 20 to 50% butene-1 characterized by being made up of components having densities of 0.88 to 0.93 and molecular weights of 500 to 8,000, about 10% by weight of a polyterpene consisting essentially of beta-pinene and about 0.5% by weight of oleylamide.

3. A coating composition consisting essentially of a blend of 70–99.5% by weight of a thermally degraded propylene–butene-1 copolymer having a molecular weight of about 1,000 to 8,000, 3–30% by weight of a synthetic hydrocarbon resin comprising a polymer of unsaturates derived from deep cracking of petroleum or from wood distillates, said resin having a molecular weight of 300 to 2,000, a softening point of 40 to 150° C., a specific gravity 25/25° C. of 0.920 to 0.980 and an acid number of less than 1 and 0.25–1.0% by weight of a slip agent selected from the group consisting of the amides of C–10 through C–30 saturated and unsaturated mono and polycarboxylic acids and the acetylated monoglycerides.

4. A substrate having coated thereon a coating composition consisting essentially of a blend of 70–99.5% by weight of a copolymer of 50 to 80% propylene with 20 to 50% butene-1, 3–30% by weight of a synthetic hydrocarbon resin comprising a polymer of unsaturates derived from deep cracking of petroleum or from wood distillates, said resin having a molecular weight of 300 to 2,000, a softening point of 40 to 150° C., a specific gravity 25/25° C. of 0.920 to 0.980 and an acid number of less than 1 and 0.25 to 1% by weight of a slip agent selected from the group consisting of the amides of C–10 through C–30 saturated and unsaturated mono and polycarboxylic acids and acetylated monoglycerides.

5. The substrate of claim 4 wherein the coating composition is in the form of a lenticular pattern.

6. The substrate of claim 4 wherein the substrate is fibrous.

7. The substrate of claim 4 wherein the slip agent is oleyl amide.

8. A coating composition adapted for forming a three-dimensional pattern consisting essentially of 70 to 99.5% by weight of a thermally degraded copolymer of 50 to 80% propylene and 20 to 50% butene-1 characterized by being made up of components having densities of 0.88 to 0.93 and molecular weights of 500 to 8,000, 3 to 30% by weight of a hydrocarbon resin comprising a polymer of unsaturates derived from deep cracking of petroleum or from wood distillates, said resin having a molecular weight of 300 to 2,000, a softening point of 40 to 150° C., a specific gravity 25/25° C. of 0.920 to 0.980 and an acid number of less than 1, and 0.25 to 1.0% by weight of a slip agent selected from the group consisting of the amides of C–10 through C–30 saturated and unsaturated mono and polycarboxylic acids and the acetylated monoglycerides.

9. A method of preparing a coated product which comprises preparing a blend consisting essentially of 70 to 99.5% by weight of a thermally degraded copolymer of 50 to 80% propylene and 20 to 50% butene-1 characterized by being made up of components having densities of 0.88 to 0.93 and molecular weights of 500 to 8,000, 3 to 30% by weight of a hydrocarbon resin comprising a polymer of unsaturates derived from deep cracking of petroleum or from wood distillates, said resin having a molecular weight of 300 to 2,000, a softening point of 40 to 150° C., a specific gravity 25/25° C. of 0.920 to 0.980 and an acid number of less than 1, and 0.25 to 1.0% by weight of a slip agent selected from the group consisting of the amides of C–10 through C–30 saturated and unsaturated mono and polycarboxylic acids and the acetylated monoglycerides, and hot extruding the blend to obtain the coated product.

10. In the method of preparing a lenticulated colored picture comprising a paper base having a coated picture thereon by making negatives from film exposures made through a lenticular screen and a moving camera focused on the subject matter from which the picture is to be made, making printing plates from the negatives and printing reproductions therefrom, the characterizing steps which comprise coating the picture with a coating composition in molten condition consisting essentially of about 89.5% by weight of a thermally degraded copolymer of 50 to 80% propylene and 20 to 50% butene-1 characterized by being made up of components having densities of 0.88 to 0.93 and molecular weights of 500 to 8,000, about 10% by weight of a polyterpene consisting essentially of beta-pinene and about 0.5% by weight of oleyl amide, and then lenticulating the coated surface while still in the warm plastic condition.

References Cited by the Examiner

UNITED STATES PATENTS 2,770,609 11/1956 Symonds _____ 260—32.6
2,825,721 3/1958 Hogan et al. _____ 260—94.3

MORRIS LIEBMAN, *Primary Examiner.*

ALAN LIEBERMAN, *Assistant Examiner.*